United States Patent
Akiwa

(10) Patent No.: US 7,429,846 B2
(45) Date of Patent: Sep. 30, 2008

(54) STEPPING MOTOR CONTROL APPARATUS

(75) Inventor: Naotaka Akiwa, Miyota-Machi (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/738,204

(22) Filed: Dec. 18, 2003

(65) Prior Publication Data

US 2004/0169486 A1    Sep. 2, 2004

(30) Foreign Application Priority Data

Dec. 25, 2002   (JP)   ............................. 2002-373960

(51) Int. Cl.
G05B 19/40 (2006.01)
H02P 8/00 (2006.01)
H02P 6/00 (2006.01)

(52) U.S. Cl. .................. 318/685; 318/696; 318/400.01

(58) Field of Classification Search ................. 318/685, 318/696, 700, 801
See application file for complete search history.

(56) References Cited

U.S. PATENT DOCUMENTS

| | | | | |
|---|---|---|---|---|
| 4,455,520 A | * | 6/1984 | Ward et al. | 318/696 |
| 4,683,409 A | * | 7/1987 | Boillat | 318/696 |
| 4,841,214 A | * | 6/1989 | Ueda et al. | 318/696 |
| 4,963,808 A | * | 10/1990 | Torisawa et al. | 318/685 |
| 5,164,649 A | * | 11/1992 | Sarbach et al. | 318/685 |
| 5,625,269 A | * | 4/1997 | Ikeda | 318/696 |
| 5,659,234 A | * | 8/1997 | Cresens | 318/696 |
| 5,952,856 A | * | 9/1999 | Horiguchi et al. | 327/110 |
| 5,959,426 A | * | 9/1999 | Moeller et al. | 318/685 |
| 5,963,005 A | * | 10/1999 | Yamaji | 318/685 |
| 6,164,649 A | * | 12/2000 | Perkitny | 273/156 |
| 6,268,772 B1 | * | 7/2001 | Chen | 330/288 |
| 2002/0039012 A1 | * | 4/2002 | Matsuda et al. | 318/696 |

(Continued)

FOREIGN PATENT DOCUMENTS

EP    0 462 050 A1   12/1991

(Continued)

OTHER PUBLICATIONS

SGS-Thompson Microelectronics, Push Pull four channel driver L293, 1988.*

(Continued)

*Primary Examiner*—Renata McCloud
(74) *Attorney, Agent, or Firm*—Townsend and Townsend and Crew LLP

(57) ABSTRACT

A stepping motor control apparatus that is able to electrically detect the load of the stepping motor and effectively prevent step-outs by means of an inexpensive configuration. The stepping motor control apparatus is equipped with a microcomputer (10) that outputs a command pulse, a chopper-type constant current driver (20) that outputs a drive current that corresponds to the input command pulse to the stepping motor (5) and outputs a chopper signal to keep the output drive current fixed, and a load detection circuit (30) that detects the chopper signal to detect the load of the stepping motor (5). The load detection circuit (30) is equipped with a waveform shaping circuit (50) that makes the chopper signal waveform continuous to convert it to a pulse or voltage, and it detects the load of the stepping motor by means of the width of the pulse or the voltage value.

18 Claims, 4 Drawing Sheets

U.S. PATENT DOCUMENTS

2002/0089299 A1 * 7/2002 Nishimura et al. .......... 318/599
2002/0185926 A1 * 12/2002 King et al. ................ 310/68 B
2002/0195985 A1 * 12/2002 Tsai ........................... 318/696

FOREIGN PATENT DOCUMENTS

EP 402220 B1 * 3/1995
EP 684690 A2 * 11/1995
JP A-8-275592 10/1996

OTHER PUBLICATIONS

Texas Instruments L293, www.ece.utexas.edu/~valvano/EE345M/L293.pdf, 1990.*

* cited by examiner

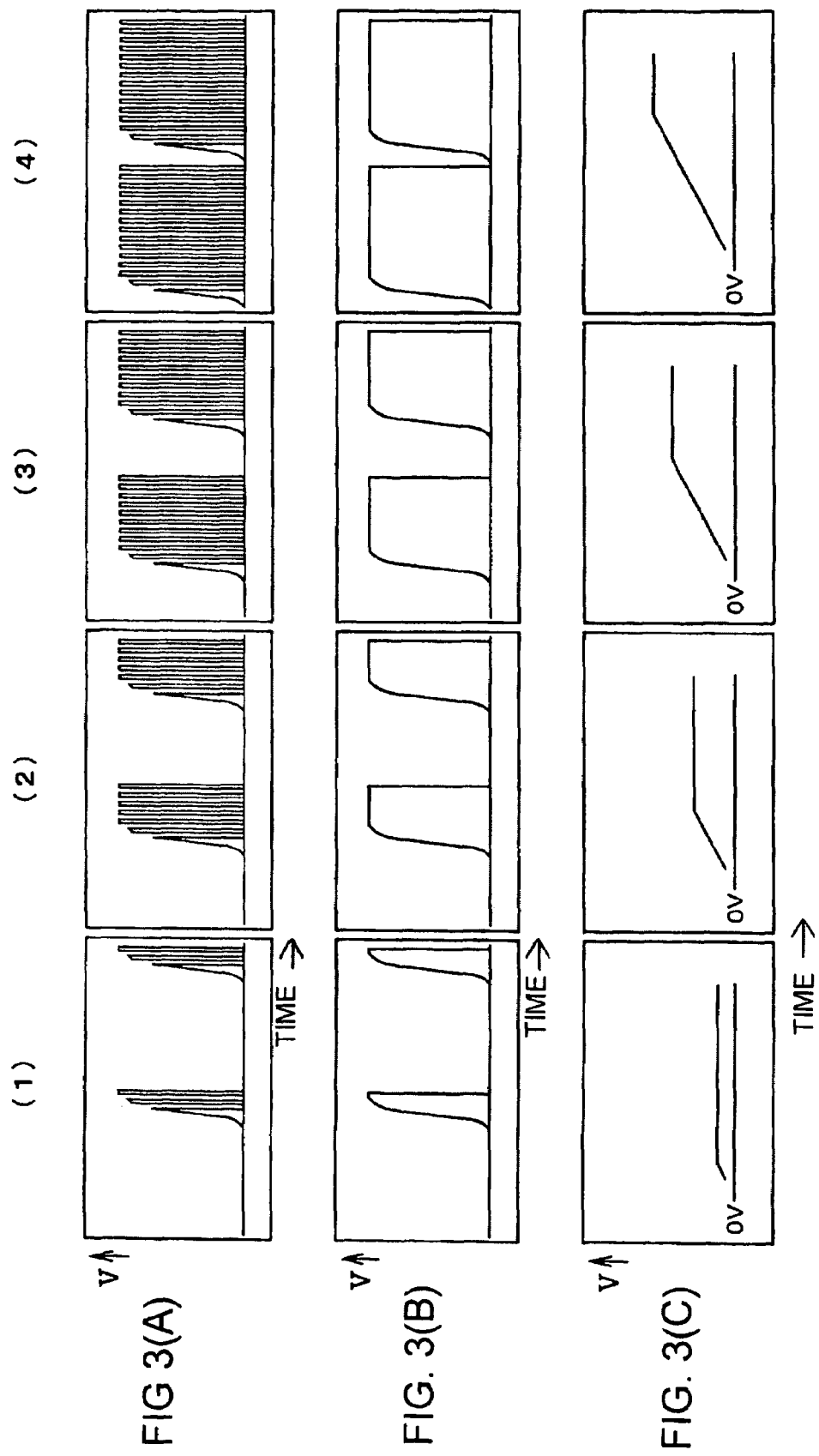

STEPPING MOTOR CONTROL APPARATUS

CROSS REFERENCE TO RELATED APPLICATION

The present application is related to, and claims priority from, Japanese patent application no. 2002-373960, filed on Dec. 25, 2002, the contents of which are incorporated herein by reference.

BACKGROUND OF THE INVENTION

The present invention relates to a stepping motor control apparatus that is able to detect changes in the load of the stepping motor. Consequently, the stepping motor control apparatus is able to control the rotation of the stepping motor so that it is normal. The present invention particularly relates to a stepping motor control apparatus that is able to prevent the occurrence of step-outs.

Stepping motors accurately rotate only at an angle that corresponds to the number of pulses provided, so they have characteristics such that open control is possible. The speed of rotation is determined according to the number of command pulses provided per unit time regardless of the load. Therefore, stepping motors have superior rotation precision and stopping precision and are widely used as drive motors of various precision machines.

However, stepping motors have a drawback in that when overloads above a fixed amount are in effect, step-outs occur that result in rotation stopping or rotation control becoming impossible. These step-outs are a characteristic that is not found in AC motors and DC motors. For this reason, countermeasures with respect to step-outs are required if a stepping motor is to be used.

An example of a step-out countermeasure employed in conventional stepping motors is shown for example in Japanese Unexamined Patent Application Publication H11-235092. An output shaft and a deceleration mechanism are connected via a torque sensor and an emergency stop is caused when the torque has exceeded a prescribed value.

However, in a method that mechanically detects the load that acts on the stepping motor in the conventional way, there is a problem in that as the number of components causes manufacturing costs to increase, and the electrical wiring becomes complicated.

SUMMARY OF THE INVENTION

In view of the above, the present invention provides a stepping motor control apparatus that is able to electrically detect the load of the stepping motor and to control the rotation of the stepping motor to make it normal and prevent the occurrence of step-outs by means of an inexpensive configuration.

The stepping motor control apparatus of the present invention is characterized in that it is equipped with a controller that outputs a command pulse, a chopper-type constant current driver that outputs a drive current that corresponds to the input command pulse to the stepping motor and outputs a chopper signal for keeping the output drive current constant, and a load detector that detects the chopper signal to detect the load of the stepping motor.

The chopper-type constant current driver uses a chopper signal to control the drive current so that it is maintained at a constant level. Specifically, when the load of the stepping motor increases, an attempt is made to also increase the current to handle the load. But, the chopper signal works to hinder an increase in current. This chopper signal acts to curtail the rectangular waveform generated by the chopper-type constant current driver in a comb shape. Therefore, the frequency at which the chopper signal is output becomes larger as the load increases.

In the stepping motor control apparatus, the load detector detects the chopper signal and detects the load of the stepping motor according to these detection results, so it is possible to perform control according to the detected load. For example, it is possible to stop or decelerate the rotation of the stepping motor and generate a signal that reports the danger of a step-out. In this way, in the present invention, the load of the stepping motor can be electrically detected and step-out can be effectively prevented by means of an inexpensive configuration.

More specifically, the load detector may be equipped with a waveform detector that detects the chopper signal and outputs a corresponding chopper waveform, and that detects the load based on the output waveform of this waveform detector. In this case, the load detection circuit is equipped with a filter portion that makes the output waveform of the waveform detector continuous to convert it to a pulse. The load detection circuit is able to detect the load based on the width of the pulse output by the filter portion. Alternatively, the load detection circuit is equipped with a filter portion that converts the output waveform of the waveform detector to voltage. Thus, it is possible to detect the load based on the signal output by this filter portion.

The filter portion may be equipped with a capacitor or a comparator. By appropriately setting the capacity of the capacitor, it is possible to set the shape of the pulse. For example, when the capacity of the capacitor is made relatively small, it is possible to make the shape of a pulse in which a comb-shaped chopper waveform is continued. Therefore, the controller can detect the load of the stepping motor based on the width of the pulse output from the filter.

By increasing the capacity of the capacitor, it is possible to make pulses such as those described above continuous to produce a flat waveform. Therefore, it is also possible to provide a configuration such that a comparator, for example, is equipped in the filter portion. Also, a signal is generated from the comparator when the flat waveform voltage has exceeded the voltage that is set or stored in the comparator.

The waveform detector can be located between the stepping motor coil and the power source. The waveform detector can be equipped with an amplifier for detecting a chopper signal. When an outputted rectangular waveform that has been curtailed to a comb shape by means of a chopper signal being output, the voltage of the drive current instantaneously drops at the time at which the chopper signal was output. By inputting this voltage drop as the base voltage of the amplifier, it is possible to detect the chopper signal as the collector current of the amplifier. This collector current waveform is a comb-shaped chopper waveform.

Moreover, when the controller stores loads for which it is expected that a step-out will occur in the stepping motor, and it is possible to perform control. Either the controller reduces the speed of rotation or stops rotation of the stepping motor when the detected load has exceeded the stored value.

BRIEF DESCRIPTION OF THE FIGURES

The accompanying figures, in which like reference numerals refer to identical or functionally similar elements and which together with the detailed description below are incorporated in and form part of the specification, serve to further illustrate preferred embodiments and to explain various principles and advantages all in accordance with the present invention.

FIG. 3(A) is a graph that shows continuous comb-shaped waveform signals (chopper waveform) output from a load detection circuit at a point A.

FIG. 3(B) is a graph that shows pulse-shaped waveform signals output from a load detection circuit at a point B.

FIG. 3(C) is a graph that shows flat-shaped waveform signals output from a load detection circuit at a point B.

DETAILED DESCRIPTION OF THE PREFERRED EMBODIMENTS

Drawings will be referred to below to explain a stepping motor control apparatus of an embodiment of the present invention.

Figure 1:
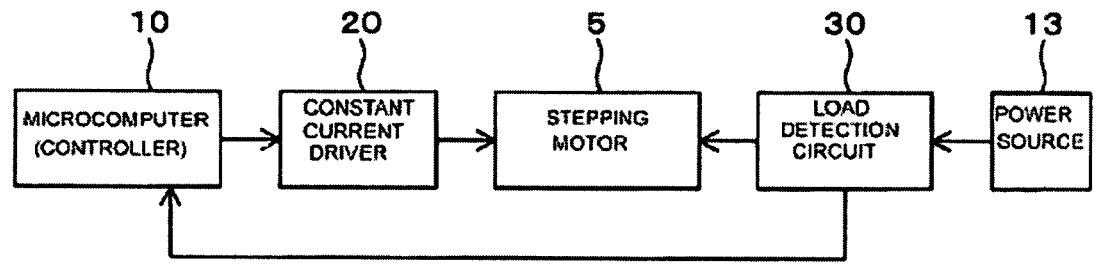
FIG. 1 is a control block that shows the control apparatus of a stepping motor according to an embodiment of the present invention.
Figure 2:
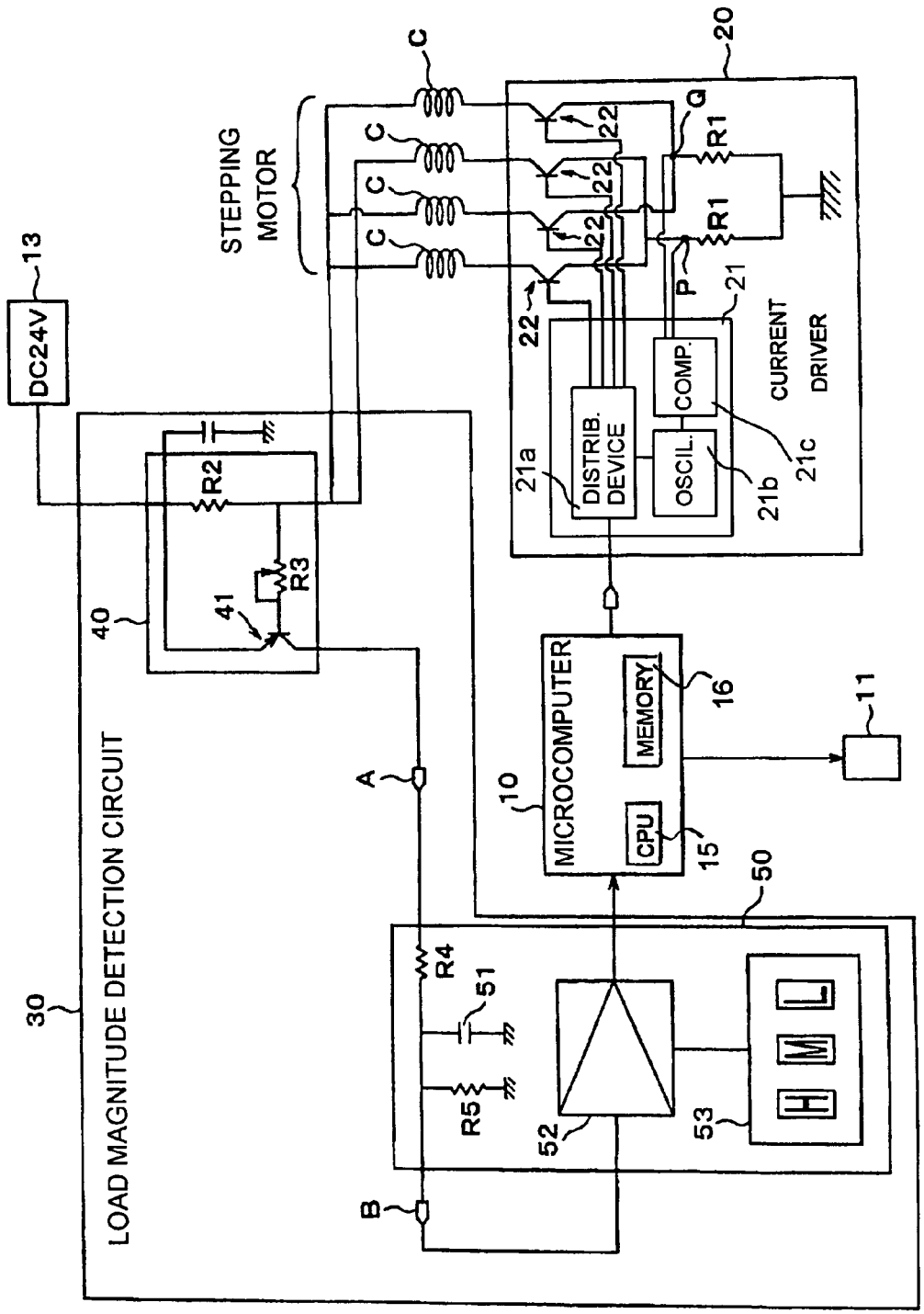
FIG. 2 is a circuit diagram that shows the control apparatus of a stepping motor according to an embodiment of the present invention.

FIG. 1 is a block diagram that shows an overview of the stepping motor control apparatus of an embodiment. FIG. 2 is a circuit diagram that shows the details of the control apparatus.

In these drawings, microcomputer 10 (controller) is equipped with a CPU, a memory, an AD converter, a DA converter, an IO interface, etc. The microcomputer 10 outputs a command pulse to a chopper-type constant current driver 20 (hereafter referred to as "constant current driver"). The constant current driver 20 supplies a constant direct current from the power source 13 to the coil C of the stepping motor 5 at a time that corresponds to the command pulse.

As is shown in FIG. 2, the constant current driver 20 is equipped with a controller, or control part, 21, and an amplifier 22 formed from, for example, field effect transistors (FETS). The controller 21 includes components such as a distributor device 21a, an oscillator 21b and a comparator 21c. The distributor device 21a may be, for example, a bistable, flip flop, integrated circuit or the like that distributes a square waveform, also referred to as a pulsed or chopper signal, to control the application of bias current to the elements of the amplifier 22 based on control signals, or pulsed signals, from the microcomputer 10. The bias current causes an emitter current to flow from the power supply 13 to the amplifier 22, forming the drive current supplied to the coils C. The comparator 21c monitors the voltage at terminals P and Q of the resistor R1 equipped between ground and the collectors of the FETS of the amplifier 22, and outputs a logical signal to the oscillator 21b upon detecting that the voltage across terminals P and Q has increased by a predetermined amount. This predetermined amount of increase indicates that the value of the drive current has increased, which in turns indicates that the magnitude of the load on the stepping motor 5 has increased. Upon receiving the logical signal from the comparator 21c, the oscillator 21b outputs a square wave, or pulsed, signal to the distributor 21a at a frequency of between approximately 10 KHz and 40 KHz to chop the control signals from the microcomputer 10. By outputting a resulting chopper signal, the controller 21 can maintain the drive current of the motor 5 at a constant level.

A load detection circuit (load detector) 30 is located between the power source 13 and the coil C. The load detection circuit 30 is equipped with a waveform detector 40. As shown in FIG. 2, the load resistor R2 built into the waveform detector 40 is located in series between the power source 13 and the coil C of the stepping motor 5. The amplifier 41 is connected in parallel to both ends of the load resistor R2 via a variable resistor R3. When a chopper signal is output, the voltage of the supplied drive current drops in that instant, which causes the base voltage of the amplifier 41 to drop. As a result, a collector current is output from the amplifier 41. This collector current is output to a waveform shaping circuit (filter portion) 50.

The waveform shaping circuit 50 is equipped with a capacitor 51 and a comparator 52 in addition to resistors R4 and R5. As shown in FIG. 3(A), the capacitor 51 makes the comb-shaped collector current waveform (hereafter referred to as "chopper waveform") continuous to create a pulse shape such as that shown in FIG. 3(B). This pulse-shaped signal is input to the microcomputer 10, and the microcomputer 10 determines the magnitude of the load of the stepping motor 5 according to the width of the pulse signal, that is, according to the time.

If the capacity of the capacitor 51 is large, the aforementioned types of pulses mutually continue, and, as shown in FIG. 3(C), a flat waveform in which the voltage differs results. Note that FIG. 3(A) shows the waveform at point A in FIG. 2, and FIGS. 3(B) and 3(C) show the waveforms at point B in FIG. 2. In this case, the flat current waveform is input to the comparator 52, and when that voltage is higher than the voltage set in advance in the comparator 52, the comparator 52 outputs a signal to the microcomputer 10. The microcomputer 10 makes a judgment as to whether or not the load of the stepping motor 5 has exceeded the prescribed amount according to the presence or absence of that signal. A comparator 52 is not used in the case where the pulse waveform shown in FIG. 3(B) is used.

Note that in FIG. 2 a select switch 53 sets the voltage in the comparator 52, and is provided in three stages. In addition, an LED 11 lights when the microcomputer 10 has determined that the load of the stepping motor 5 has exceeded a prescribed value.

Next, the operation of the control apparatus of a stepping motor with the above configuration will be explained.

When a command pulse from the microcomputer 10 is output to the constant current driver 20, the controller 21 outputs a rectangular waveform that is of the same width (time) as the command pulse to the amplifier 22. Through this, an emitter current flows from the power source 13 to the amplifier 22, and a drive current is supplied to the coil C.

Figure 4A:
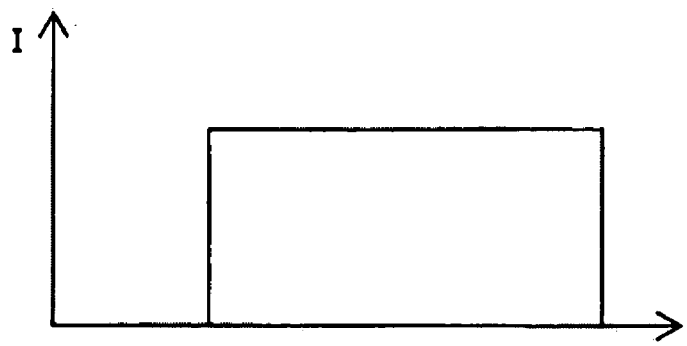
FIG. 4(A) is a graph that shows the waveform of the drive current supplied from a power source.
Figure 4B:
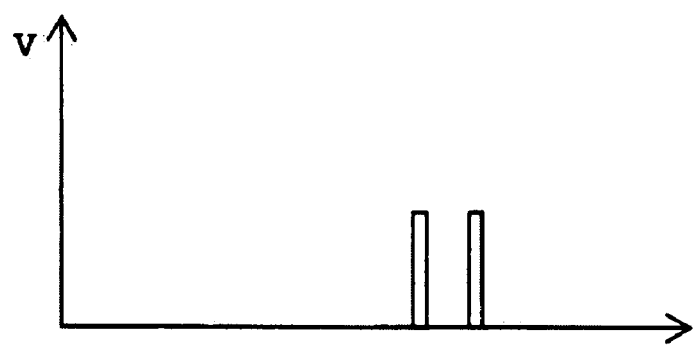
FIG. 4(B) is a graph that shows a chopper signal waveform.
Figure 4C:
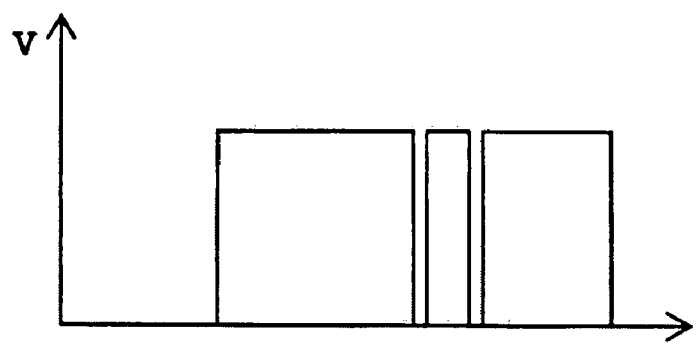
FIG. 4(C) is a graph that shows a waveform of a rectangular shape when a chopper signal has been output.
Figure 4D:
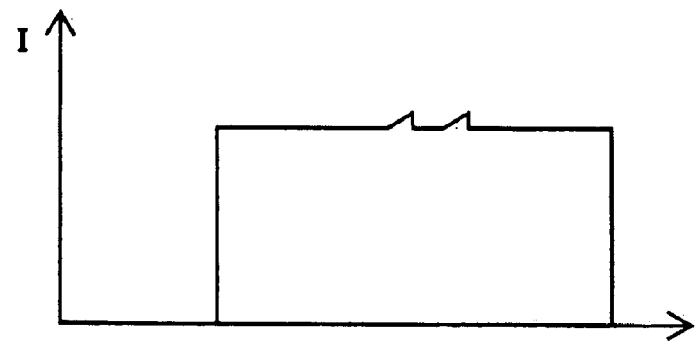
FIG. 4(D) is a graph that shows a waveform of the drive current when a chopper signal has been output.

FIG. 4(A) shows the waveform of the drive current supplied from the power source 13. Here, when the load of the stepping motor 5 increases, the drive current supplied from the power source 13 increases. Consequently, the voltages of the end portions (points P and Q) of the resistors R1 are increased, which is detected by the controller 21 to output a chopper signal. FIG. 4(B) shows the chopper signal waveform. FIG. 4(C) shows the waveform of the rectangular waveform output by the controller 21 when the chopper signal has been output. As shown in FIG. 4(C), the rectangular waveform becomes a shape that has been curtailed to a comb shape at the time at which the chopper signal was output. The waveform of the drive current when this type of comb-shaped rectangular waveform has been output to the amplifier 22 is shown in FIG. 4(D). As shown in this drawing, when the load of the stepping motor 5 increases and the drive current supplied from the power source 13 increases, the chopper signal is immediately output, and the current value of the drive current drops. For this reason, as shown in FIG. 4(D), the current value that was increased along with the increase in the load is directly returned, so the value of the drive current becomes essentially constant.

When the current value of the increased drive current drops, a voltage drop occurs in the load resistor R2. Through this voltage drop, the base voltage of the amplifier 41 with which the waveform detector 40 is equipped drops, and a collector current flows to the amplifier 41. That collector current becomes the comb-shaped chopper waveform shown in FIG. 3(A), which has been synchronized with the chopper signal.

Column (1) of FIGS. 3(A)-3(C) is such that the load of the stepping motor 5 is nearly at the rated status, and in this case, the amount of chopper signals output from the constant current driver 11 is small. In FIG. 3(A), the load increases as shown in the waveform moving from column (1) to column (4), the chopper signals increase, and the waveform in column (4) is the status immediately before a step-out occurs in the stepping motor 5. In addition, as the amount of chopper signals becomes larger, the width of the pulse shown in FIG. 3(B) becomes longer, and the value of the voltage shown in FIG. 3(C) becomes higher.

The memory of the microcomputer 10 stores the prescribed pulse width (time) or voltage as a threshold value, and if the signal input from the load detection circuit 30 has exceeded the threshold value, output of the command pulse is stopped to stop the rotation of the stepping motor 5. Also, the microcomputer 10 causes the LED 11 to light at that time.

In a stepping motor control apparatus with the aforementioned configuration, when the load of the stepping motor increases and a chopper signal is output, the waveform detector portion 40 of the load current detection circuit 30 detects the chopper signal to output the chopper waveform. Therefore, it is possible to detect the load of the stepping motor and prevent the occurrence of step-outs by means of an inexpensive configuration without using a mechanical configuration such as a torque sensor.

As explained above, through the present invention, a load detector is equipped that detects the chopper signal to detect the load of the stepping motor, so it is possible to electrically detect the load of the stepping motor and effectively prevent step-outs by means of an inexpensive configuration.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A stepping motor control apparatus comprising:
a controller for outputting a command pulse;
a chopper-type constant current driver for outputting a drive current that corresponds to the command pulse input from the controller, wherein the chopper-type constant current driver includes a control part and an amplifier and, the control part outputs a chopper signal to the amplifier to keep the drive current constant; and
a load detector for detecting the chopper signal, wherein
the chopper signal is output when the drive current increases,
a voltage of the drive current instantaneously drops at a time at which the chopper signal is output,
and the chopper signal is indicative of a magnitude of a load of the stepping motor,
the load detector comprises a waveform detector for detecting the chopper signal and for outputting an output waveform, which is a chopper waveform that corresponds to the chopper signal,
the load detector detects the magnitude of the load based on the output waveform,
the waveform detector includes a load resistor and a detector amplifier, and the load resistor is located in series between a power source and a coil of a stepping motor,
a voltage drop occurs in the load resistor when the chopper signal is output, and
through the voltage drop in the load resistor, the base voltage of the detector amplifier drops and a collector current of the detector amplifier flows as the output waveform, which is comb-shaped and synchronized with the chopper signal.

2. A stepping motor control apparatus according to claim 1, wherein the load detector further comprises a filter portion for making the output waveform of the waveform detector continuous and for converting the output waveform to a pulse.

3. A stepping motor control apparatus according to claim 2, wherein the load detector detects the magnitude of the load based on the width of the pulse output by the filter portion.

4. A stepping motor control according to claim 1, wherein the load detector comprises a filter portion for converting the output waveform of the waveform detector to a flat waveform in which the voltage differs according to the output waveform.

5. A stepping motor control according to claim 4, wherein the load detector detects the magnitude of the load based on the voltage of the flat waveform output by the filter portion.

6. A stepping motor control according to claim 1, wherein the waveform detector is located between the coil and a power source.

7. A stepping motor control according to claim 6, wherein the collector current is generated when a voltage of the coil decreases corresponding to the chopper signal.

8. A stepping motor control apparatus according to claim 1, wherein the controller stores loads for step-outs in the stepping motor.

9. A stepping motor control apparatus according to claim 8, wherein the controller reduces the speed of rotation of the stepping motor.

10. A stepping motor control apparatus according to claim 8, wherein the controller stops the rotation of the stepping motor when a detected load magnitude has exceeded a predetermined value.

11. A stepping motor control apparatus according to claim 1, wherein the control part outputs a rectangular waveform to a base of the amplifier when a command pulse has been input.

12. A stepping motor control apparatus according to claim 11, further comprising a resistor located between the collector of the amplifier and a ground.

13. A stepping motor control apparatus according to claim 2, wherein the filter further comprises a capacitor and a plurality of resistors.

14. A stepping motor control apparatus according to claim 13, wherein the capacitor makes the output waveform continuous to create a pulse shape or a flat waveform.

15. A stepping motor control apparatus comprising:
a controller for outputting a command pulse;
a chopper-type constant current driver for outputting a drive current that corresponds to the command pulse input from the controller, wherein the shopper-type constant current driver includes a control part and an amplifier and, the control part outputs a chopper signal to the amplifier to keep the drive current constant; and
a load detector for detecting the chopper signal, wherein
the chopper signal is output when the drive current increases, and the chopper signal is indicative of a magnitude of a load of the stepping motor,
the load detector comprises a waveform detector for detecting the chopper signal and for outputting output waveform, which is a chopper waveform that corresponds to the chopper signal,
the load detector detects the magnitude of the load based on the output waveform,
the load detector further comprises a filter portion for making the output waveform of the waveform detector continuous and for converting the output waveform to a pulse,
the filter further comprises a capacitor and a plurality of resistors,
a voltage of the drive current instantaneously drops at a time at which the chopper signal is output,
the waveform detector includes a load resistor and a detector amplifier, and the load resistor is located in series between a power source and a coil of a stepping motor,
a voltage drop occurs in the load resistor when the chopper signal is output,
through the voltage drop in the load resistor, the base voltage of the detector amplifier drops and the collector current flows as the output waveform, which is comb-shaped and synchronized with the chopper signal, and
the capacitor makes the output waveform continuous to create a pulse shape or a flat waveform.

16. A stepping motor control apparatus according to claim 4, wherein the filter portion includes a capacitor and a plurality of resistors.

17. A stepping motor control apparatus according to claim 16, wherein the capacitor makes the output waveform continuous to create a pulse shape or a flat waveform.

18. A stepping motor control apparatus comprising:
a controller for outputting a command pulse;
a chopper-type constant current driver for outputting a drive current that corresponds to the command pulse input from the controller, wherein the chopper-type constant current driver includes a control part and an amplifier and, the control part outputs a chopper signal to the amplifier to keep the drive current constant; and
a load detector for detecting the chopper signal, wherein
the chopper signal is output when the drive current increases, and the chopper signal is indicative of a magnitude of a load of the stepping motor,
the load detector comprises a waveform detector for detecting the chopper signal and for outputting an output waveform, which is a chopper waveform that corresponds to the chopper signal,
the load detector detects the magnitude of the load based on output waveform of the waveform, detector,
the load detector comprises a filter portion for converting the output waveform of the waveform detector to a flat waveform in which the voltage differs according to the output waveform,
the filter portion includes a capacitor and a plurality of resistors, and
a voltage of the drive current instantaneously drops at a time at which the chopper signal is output,
the waveform detector includes a load resistor and a detector amplifier, and the load resistor is located in series between a power source and a coil of a stepping motor,
a voltage drop occurs in the load resistor when the chopper signal is output,
through the voltage drop in the load resistor, a base voltage of the amplifier drops and a comb-shaped collector current, which corresponds to the output waveform, flows and is synchronized with the chopper signal, and
the capacitor makes the output waveform continuous to create a pulse shape or a flat waveform.

\* \* \* \* \*